United States Patent
Moran (10) Patent No.: US 6,536,620 B2
(45) Date of Patent: Mar. 25, 2003

(54) VACUUM BOTTLE WITH DUAL INTERLOCKING CUPS AND MODULAR BASE ASSEMBLY

(75) Inventor: Jorge E. Moran, Nashville, TN (US)

(73) Assignee: Megatrade International, Inc., Nashville, TN (US)

(*) Notice: Subject to any disclaimer, the term of this patent is extended or adjusted under 35 U.S.C. 154(b) by 8 days.

(21) Appl. No.: 09/984,820

(22) Filed: Oct. 31, 2001

(65) Prior Publication Data
US 2002/0092148 A1 Jul. 18, 2002

Related U.S. Application Data

(62) Division of application No. 09/758,226, filed on Jan. 12, 2001, now Pat. No. 6,332,557.

(51) Int. Cl.[7] ............................................. B65D 23/10
(52) U.S. Cl. ....................... 215/396; 215/398; 215/13.1
(58) Field of Search ................................. 215/396, 398, 215/12.1, 13.1; 220/759, 757, 762, 763, 764, 592.16, 592.17, 592.22, 592.23, 592.27

(56) References Cited

U.S. PATENT DOCUMENTS

| | | | |
|---|---|---|---|
| 1,517,978 A | | 12/1924 | Giese |
| 2,147,263 A | | 2/1939 | Mills |
| 2,186,338 A | | 1/1940 | Mills |
| 4,026,274 A | | 5/1977 | Gutierrez |
| 4,184,601 A | | 1/1980 | Stewart et al. |
| 4,388,996 A | | 6/1983 | Panicci |
| 4,488,660 A | * | 12/1984 | Murakami ................. 215/12.1 |
| 4,585,134 A | * | 4/1986 | Miyaji et al. ................. 215/398 |
| 4,625,884 A | | 12/1986 | Zimmermann |
| 4,676,411 A | | 6/1987 | Simasaki |
| 4,768,664 A | | 9/1988 | Zimmermann |
| 5,299,705 A | | 4/1994 | Dettmar |
| 5,417,336 A | | 5/1995 | Cortez |
| 5,529,204 A | | 6/1996 | Sykes |
| 5,573,141 A | | 11/1996 | Chen |
| 5,727,709 A | | 3/1998 | Nobile |
| D411,716 S | | 6/1999 | Besser et al. |
| D418,374 S | | 1/2000 | McNamee et al. |
| 6,105,799 A | | 8/2000 | Takagawa |

FOREIGN PATENT DOCUMENTS

| | | |
|---|---|---|
| GB | 2 033 573 A | 11/1978 |
| GB | 2 039 214 A | 11/1978 |

* cited by examiner

Primary Examiner—Stephen Castellano
(74) Attorney, Agent, or Firm—Hunton & Williams (57) ABSTRACT

A vacuum-insulated beverage container has a body and a vacuum-insulated liner enclosed by the body. Seals between the body and the liner prevent all types of leaks of the beverage held in the liner. A handle is attached to the container using a method that permits the handle to be removably attached with only a single removable fastener. Nesting drinking cups are provided that removably attach to the container and to one another. The drinking cups can be separated from one another by directly pulling the cups apart or by rotating one cup relative to another.

5 Claims, 11 Drawing Sheets

VACUUM BOTTLE WITH DUAL INTERLOCKING CUPS AND MODULAR BASE ASSEMBLY

RELATED APPLICATIONS

This application is a divisional of U.S. patent application Ser. No. 09/758,226 filed on Jan. 12, 2001, now patent No. 6,332,557.

BACKGROUND OF THE INVENTION

1. Field of the Invention

The field of this invention is portable beverage containers and more specifically vacuum-insulated portable beverage containers for carrying and dispensing liquids.

2. Description of Related Art

Various designs for portable beverage containers, including vacuum-insulated portable beverage containers, are known in the art. None have all of the advantageous features of the container of this invention. More specifically, the prior art containers do not include the same capability as this container to seal against all kinds of beverage leaks. The prior art containers also do not have the same advantageous connecting means for connecting a handle as this container. The prior art containers also do not have nesting cups which attach to and detach from the container and to one another in the same advantageous manner as this container.

SUMMARY OF THE INVENTION

According to one aspect of the invention, a beverage container has a body including a body cylinder portion and a base portion. The body cylinder portion and the base portion have complementary screw threads formed thereon and are attached to one another by the complementary screw threads. The body cylinder portion has a first open end. A liner is generally disposed inside of the body and includes an open end and an interior space for holding liquids, the interior space being vacuum-insulated for resisting heat transfer between the interior and the exterior of the liner. The open end approximately aligns with the first open end of the body cylinder. An elongated handle is attached at a first end to the base portion and at an opposing second end to the body cylinder portion with attaching means for attaching the handle to the body with a single removable fastener.

According to another aspect of the invention, a beverage container has a body with an opposing first open end and a second open end. A liner is generally disposed inside of the body and includes an open end and an interior space for holding liquids. The interior space is vacuum-insulated for resisting heat transfer between the interior and the exterior of the liner, and the open end generally aligns with the first open end of the body. A first gasket closes the space between an open end of the liner and the first open end of the body and prevents liquids from passing in between the open end of the liner and the first open end of the body. A base plug is disposed in the second open end of the body, the base plug exerting force on the liner to hold the liner in position inside of the body. A second gasket closes the space between the base plug and the second open end of the body and prevents liquids from passing in between the base plug and the second open end of the body. A stopper removably attaches to the body near the first open end of the body. A third gasket closes the space between the stopper and the first open end of the body and prevents liquids from passing in between the stopper and the first open end of the body when the stopper is attached to the body. Two drinking cups are removably attached to the body near the first open end. Each of the cups has an exterior locking groove with a top lip above the exterior locking groove and an interior locking flange. A largest radius of the top lip is larger than a smallest radius of the interior locking flange and the interior locking flange can flex to slide past the largest radius of the top lip and engage the exterior locking groove. The exterior locking groove and the interior locking flange each have a ramping surface so that when the cups are rotated relative to one another in a first direction the ramping surfaces cam, and further rotation in the first direction causes the interior locking flange to flex so that the interior locking flange disengages with the exterior locking groove.

The accompanying drawings, which are incorporated and constitute a part of this specification, illustrate embodiments of the invention and, together with the description, serve to explain the principles of the invention.

DETAILED DESCRIPTION OF THE PREFERRED EMBODIMENTS

Reference will now be made in detail to the present preferred embodiments of the invention, examples of which are illustrated in the accompanying drawings in which like reference characters refer to corresponding elements.

Figure 1:
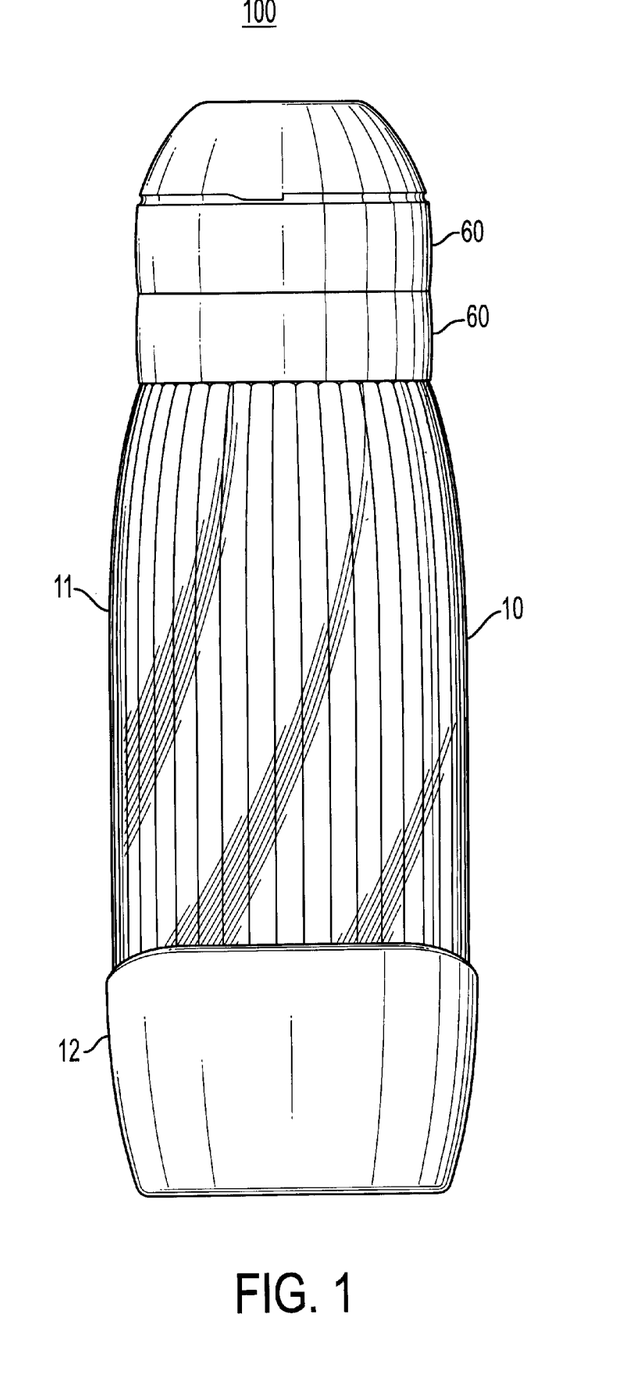
FIG. 1 is a front elevational view of a container with two cups nested thereon in accordance with an embodiment of the present invention.
Figure 4:
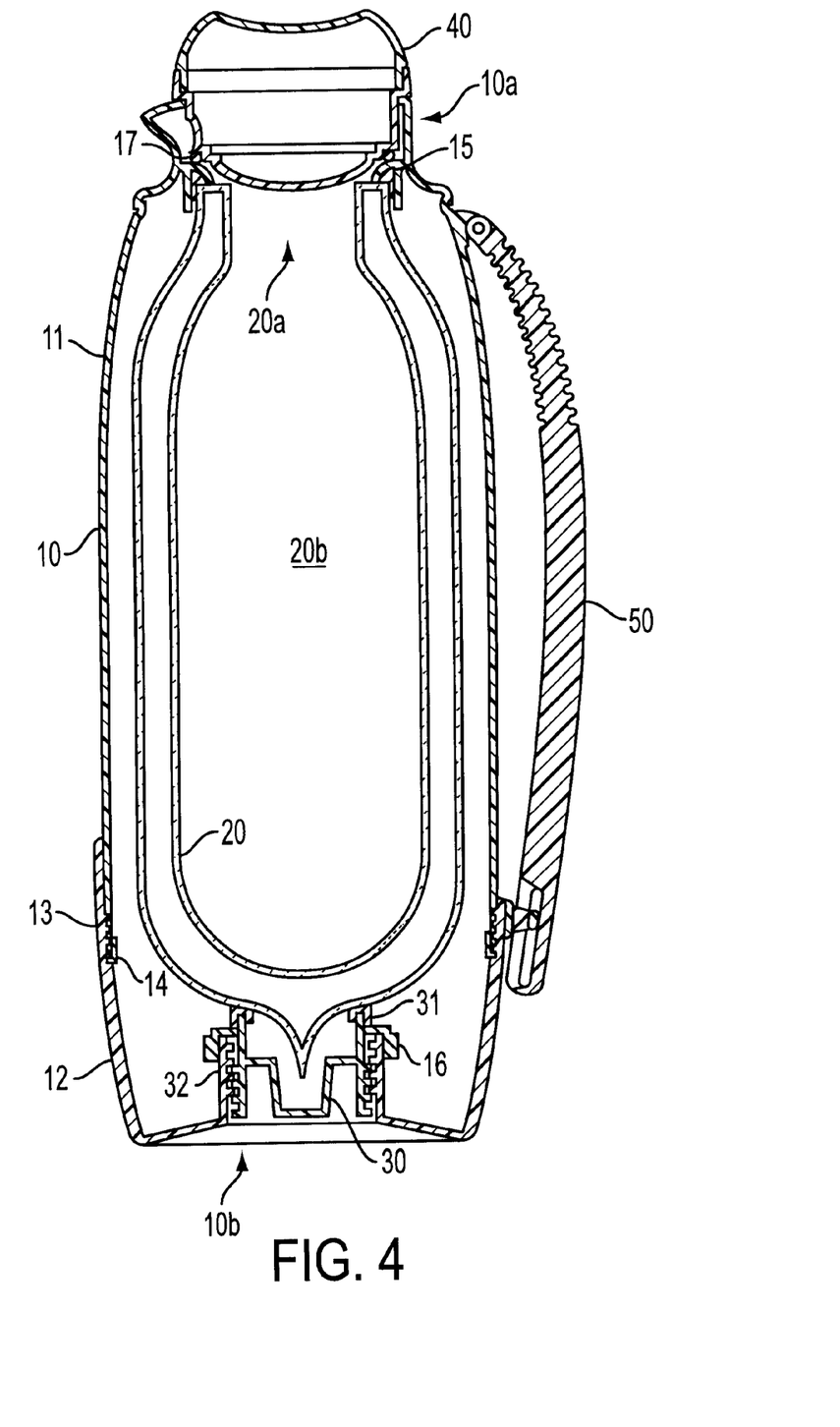
FIG. 4 is a sectional view of the container taken along cutting line 4—4 in FIG. 3.

With reference to FIG. 4, a container 100 of the preferred embodiments comprises a body 10, a liner 20, a base plug 30, a stopper 40, and a handle 50. FIG. 1 illustrates two cups 60 which may be nested on top of the container 100.

The body 10 includes a first open end 10a and a second open end 10b. The body 10 may be one unitary piece, or may be an assembly of several separate pieces joined together. In a preferred embodiment, the body 10 includes two separately formed portions: a body cylinder 11 and a base 12. The body cylinder 11 and the base 12 are joined together during assembly of the container 100. In the preferred embodiment, complementary threads 13 are formed on the exterior of the body cylinder 11 and the interior of the base 12. A gasket 14 is disposed between the body cylinder 11 and the base 12 to seal against leakage of liquid from and into the interior of the container 100.

A liner 20 is generally disposed inside of the body 10. The liner 20 includes an open end 20a and an interior space 20b for holding liquids. The interior space 20b is vacuum-insulated against heat transfer between the exterior of the liner 20 and the interior space 20b in a manner well known in the art. The open end 20a is approximately aligned with the first open end 10a of the body 10. A gasket 15 closes the space between the open end 20a of the liner 20 and the first open end 10a of the body 10 and seals against leakage of liquid from and into the interior of the container 100.

A base plug 30 is disposed in the second open end 10b of the body 10. In a preferred embodiment, the second open end 10b is formed in the base 12. The base plug 30 exerts a force on the liner 20 in the direction of the first open end 10a and holds the liner 20 generally stationary inside of the body 10. A force also assists with sealing the container 100 by compressing the gasket 15 against the first open end 10a and the open end 20a of the liner 20. A gasket 16 closes the space between the base plug 30 and the body 10 and seals against leakage of liquid from and into the interior of the body 10. A rubber bumper 31 may be disposed between the base plug 30 and the liner 20 to more evenly distribute the force against the liner 20. The rubber bumper 31 and the gasket 15 will also act as dampers to absorb some of the shocks and vibrations that would be transferred from the body 10 to the liner 20. The rubber bumper 31 and the gasket 15 also accommodate the expansion and contraction of the liner 20 when it is filled with hot or cold liquids. In the preferred embodiment, the rubber bumper 31 can also help hold the gasket 16 in position. In order to produce the force which the base plug 30 exerts against the liner 20, the base plug 30 and the body 10 are provided with complementary threads 32. Screwing the base plug 30 into the body 10 with the complementary threads 32 will advance the base plug 30 axially against the liner 20.

A stopper 40 removably attaches to the body 10. The stopper 40 may be partially or completely detached in order to pour or dispense liquids from the interior space 20b. A gasket 17 closes the space between the stopper 40 and the body 10 and seals against leakage of liquid from and into the interior of the container 100 when the stopper 40 is attached to the body 10. As is known in the art, the stopper 40 may be removably attached to the body 10 using complementary threads or any other connection suitable for this purpose.

Due to the placement of the gaskets 15, 16, and 17, liquids inside the interior space 20b are generally prevented from leaking i) from the interior space 20b to the space between the body 10 and the exterior of liner 20, and ii) from anywhere inside the body 10 to the exterior of the container 100. In particular, the gasket 15 generally prevents internal leakage of liquids from the interior space 20b to the space between the body 10 and the exterior of the liner 20. Even if any liquids do reach the space between the body 10 and the exterior of the liner 20, such as would occur if the liner 20 shattered inside of the body 10, liquid would be prevented from leaking from the container 100 by the gaskets 16 and 17 (with the stopper 40 in place). The gaskets 15, 16, and 17 also prevent any liquids from penetrating inside the container 100—either the interior space 20b or in the space between the body 10 and the exterior of the liner 20—when, for example, the container 100 is submersed during washing. If the body 10 is formed of more than one piece, the pieces should be joined in a leak-tight manner, such as by using the threaded connection 13 with the gasket 14 between the body cylinder 11 and the base 12.

As shown in FIGS. 4, 5A–B, and 6A–C, the flexible handle 50 is attached at a first end to the base 12 and at a second opposing end to the body cylinder 11 by attaching means. The attaching means includes one screw-type connection and one T-type connection. The flexible handle 50 is either attached to the base 12 with a T-type connection and to the body cylinder 11 with a screw-type connection, or the flexible handle 50 is attached to the base 12 with a screw-type connection and to the body cylinder 11 with a T-type connection. There must be at least one screw-type connection.

In general, the screw-type connection is formed by providing a hole in a first part and a hole in a second part, aligning those two holes, and inserting a screw or other fastener into the two holes for removably attaching the two parts.

Figures 6A, 6B:
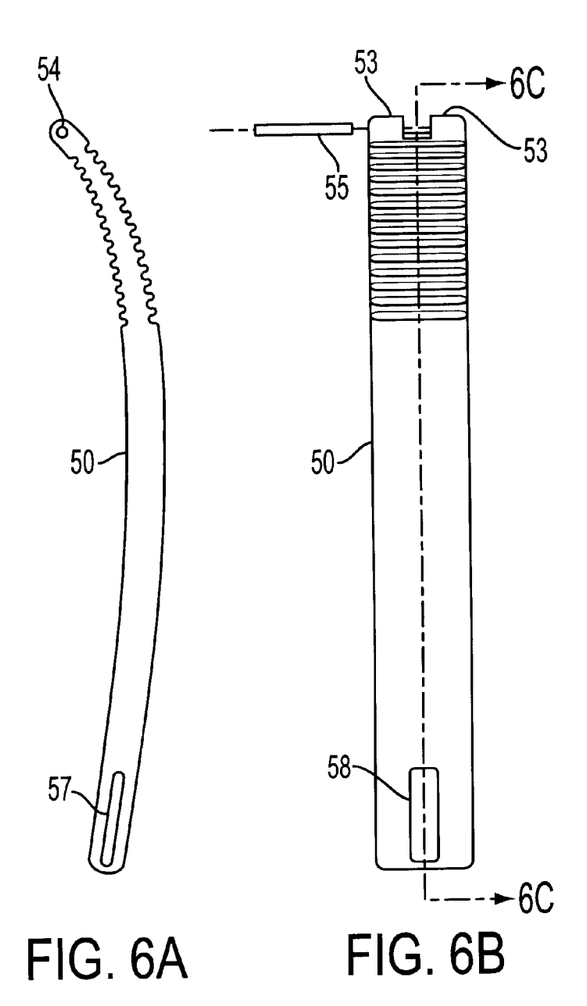
FIG. 6A is a side elevational view of the handle on the container of FIG. 3.
FIG. 6B is front elevational view of the handle of FIG. 6A.
Figure 6C:
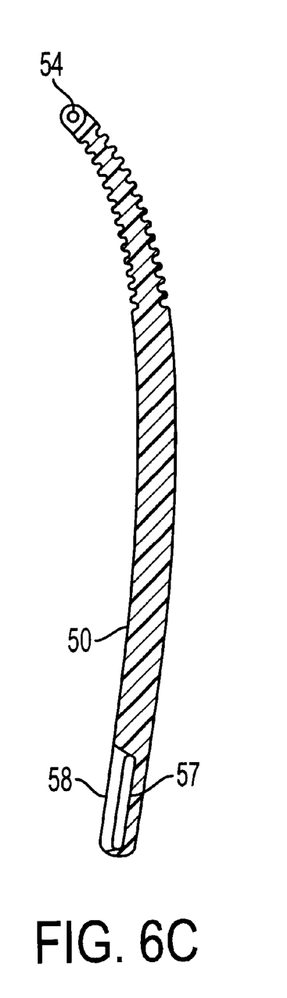
FIG. 6C is a sectional view of the handle taken along cutting line 6A—6A of FIG. 6B.
Figure 7A:
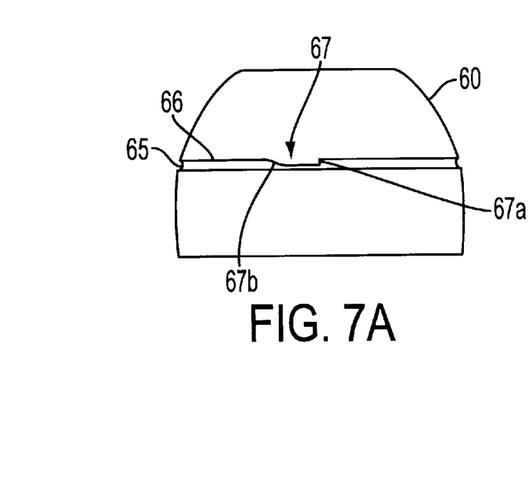
FIG. 7A is a front elevational view of the cup in FIG. 1.
Figure 7B:
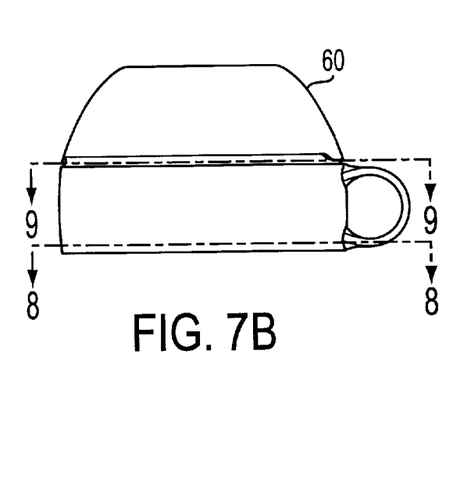
FIG. 7B is a side elevational view of the cup in FIG. 1.
Figure 7C:
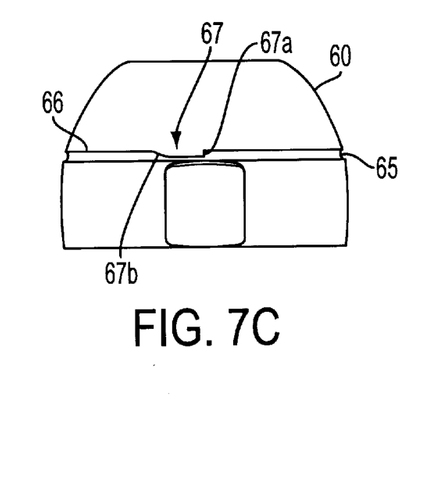
FIG. 7C is a rear elevational view of the cup in FIG. 1.
Figure 7D:
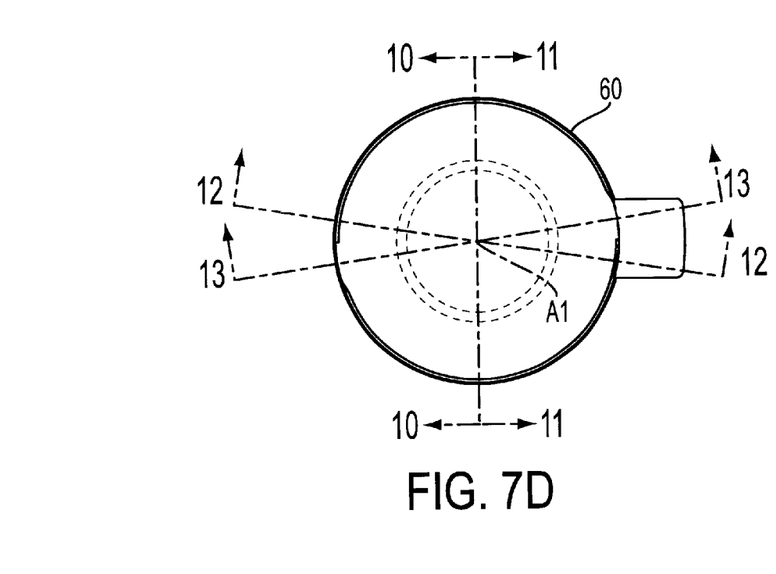
FIG. 7D is a top plan view of the cup in FIG. 1.
Figure 8:
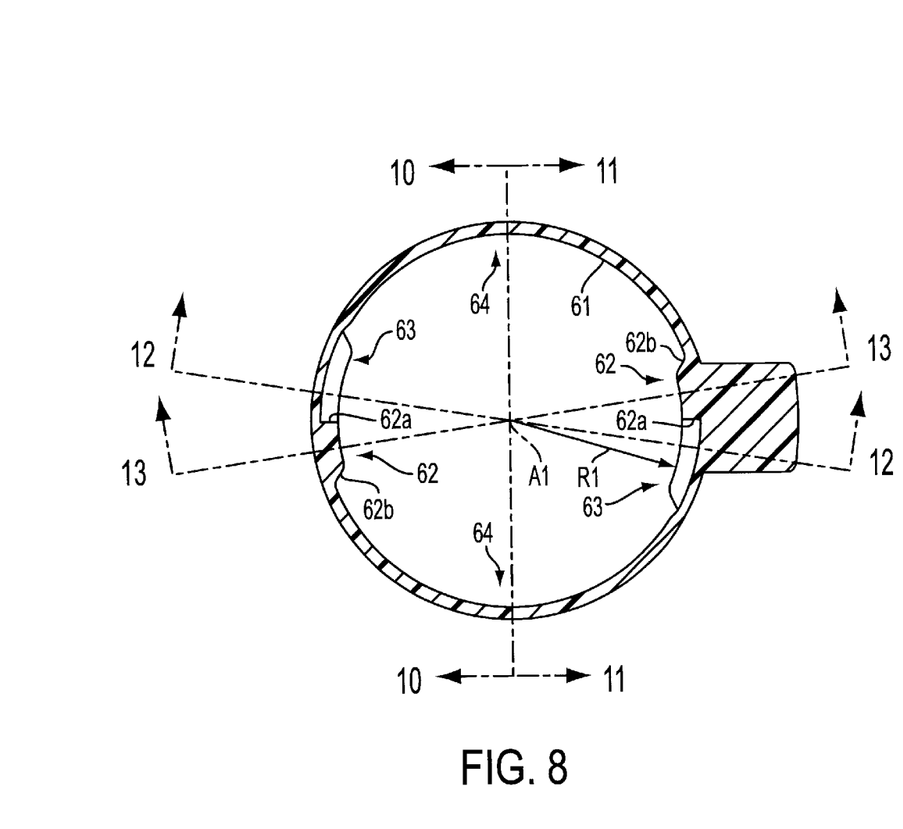
FIGS. 8–13 are sectional views of the cup taken from cutting lines indicated in FIG. 7D.
Figure 9:
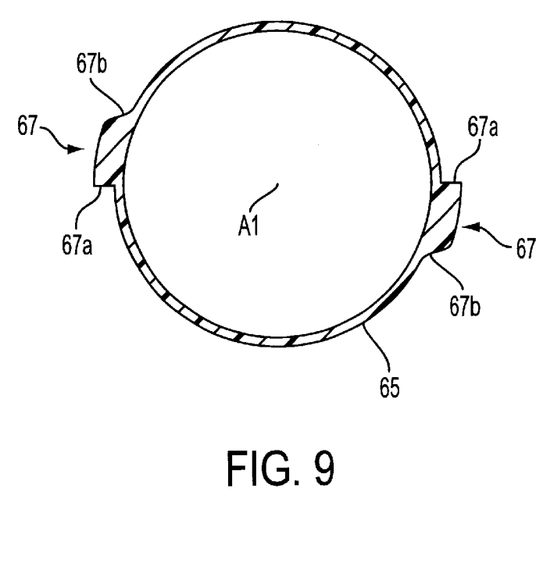
Figure 10:
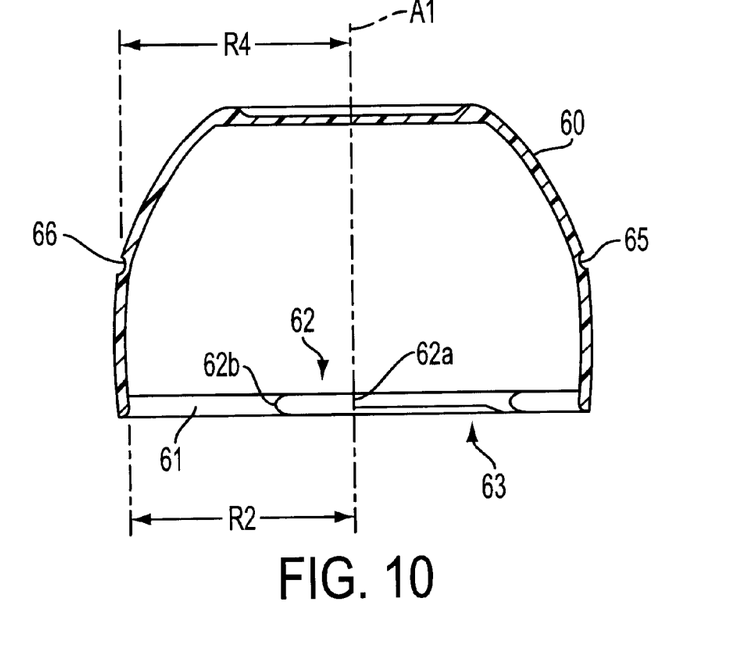
Figure 11:
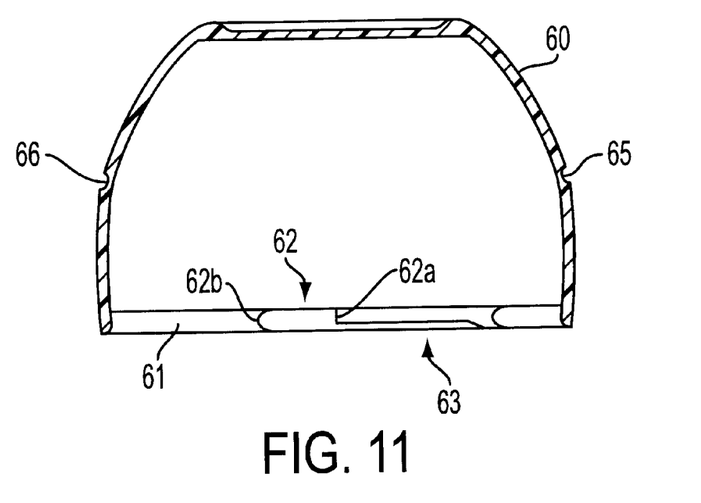
Figure 12:
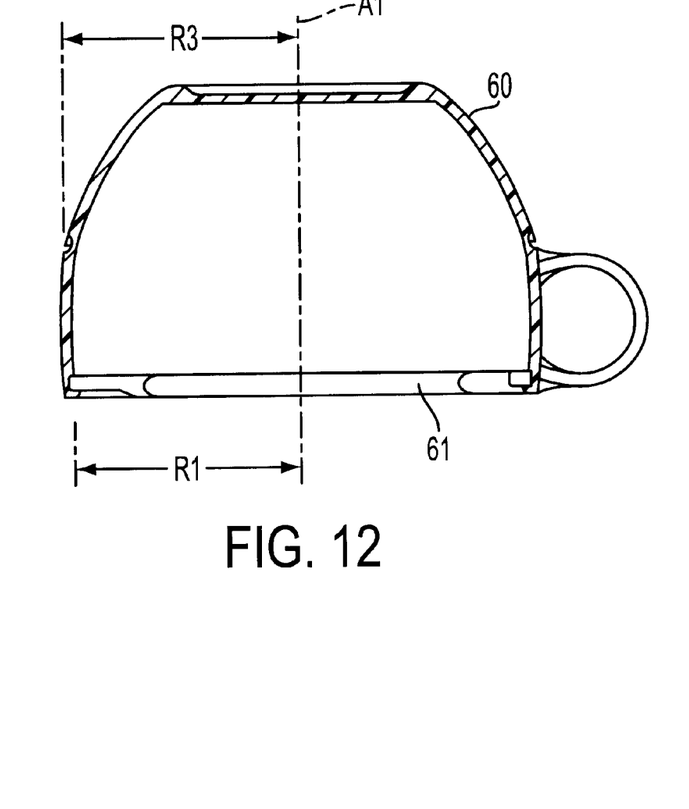
Figure 13:
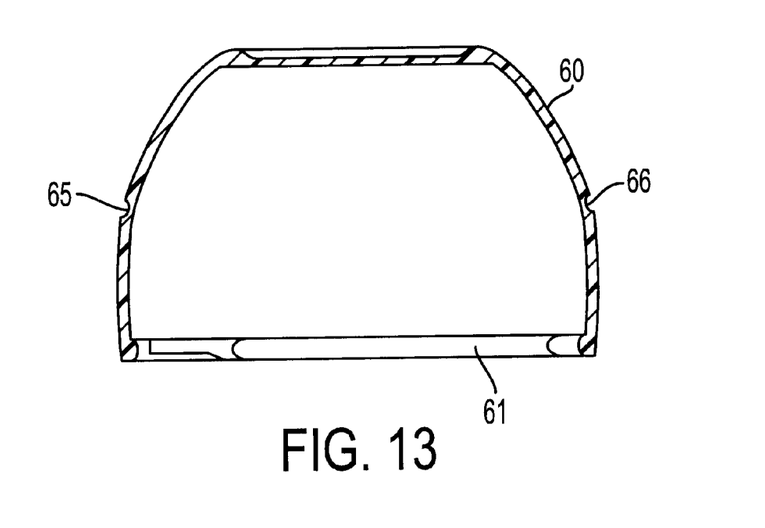

For example, in a preferred embodiment, a post 51 projects from the body cylinder 11 and has a hole 52 formed therein. The flexible handle 50 includes two matching end projections 53 with a hole 54 passing through each. The two end projections 53 fit around the post 51 and the two holes 52, 54 register with one another while a screw 55 is threaded into the two holes 52, 54 to hold the flexible handle 50 and the body cylinder 11 together. This arrangement allows a small amount of relative rotation between the body portion 11 and the flexible handle 50 about an axis coaxial with the screw 55. Other screw-type connections known in the art are also acceptable.

In general, the T-type connection is formed by providing a "T"-shaped projection on one part. On the other part are formed a slot and an opening to the slot. The "T"-shaped projection is partially inserted into the opening and into the slot and then the handle is turned 90°. Once the handle is turned 90°, the "T"-shaped projection can no longer pass through the opening so that it is partially locked inside the slot.

Figure 5A:
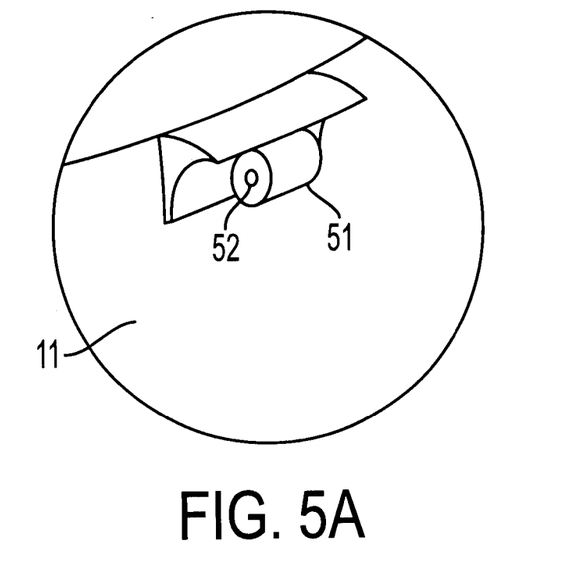
FIGS. 5A and 5B are detail views of the container of FIG. 3.
Figure 5B:
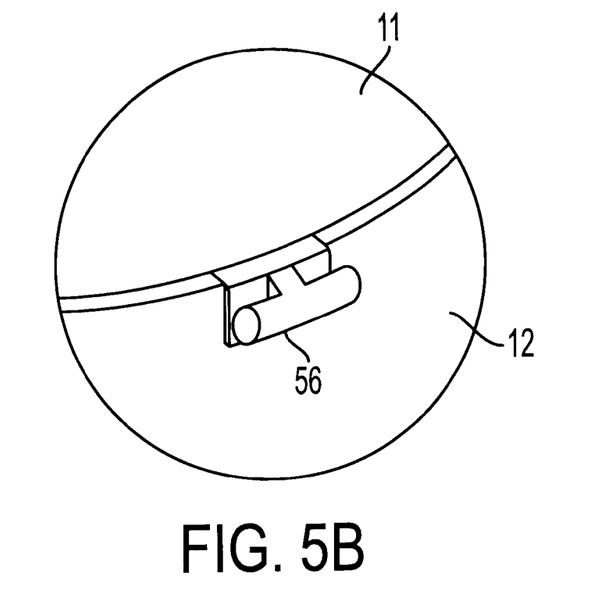

For example, in the preferred embodiment a "T"-shaped projection 56 projects from the base 12. A slot 57 is formed in the flexible handle 50. An opening 58 is formed adjacent the slot 57. To assemble the T-type connection, the "T"-shaped projection 56 is aligned with and inserted into the opening 58 formed in the handle 50. When the "T"-shaped projection 56 has passed through the opening 58 and into the slot 57, the flexible handle 50 is turned 90° relative to the "T"-shaped projection 56. When the flexible handle 50 is turned 90°, the "T"-shaped projection 56 is locked inside of the slot 57 because it is no longer properly aligned to pass through opening 58. This arrangement allows a small amount of relative sliding motion between the flexible handle 50 and the base 12. Other T-type connections known in the art are also acceptable.

Attaching means advantageously permit the flexible handle 50 to be detached so the base 12 can be removed and the liner 20 can be replaced, if necessary. The attaching means attach the flexible handle 50 to the body 10 using only one separate and removable fastener—screw 55. This is advantageous as a reduction in the number of separate parts and assembly time. Also, because the flexible handle 50 may rotate slightly relative to the body cylinder 11 at the screw-type connection and may slide slightly relative to the base 12 at the T-type connection, the flexible handle 50 extends away from the container to facilitate carrying as in FIG. 2, and can fold flush with the container for storage. Having the T-type connection formed on the base 12 can be an advantage since the base 12, in the preferred embodiment, is constructed of ABS plastic. The T-type connection, when constructed with ABS plastic, will be tough and resistant to cracking.

The "T"-shaped projection 56 formed on the base 12 and the post 51 formed on the body cylinder 11 must be in alignment after the base 12 is screwed onto the body cylinder 11. A stop can be provided with complementary threads 13 formed between the base 12 and the body cylinder 11 to facilitate this alignment. Since the base 12 is not readily adjustable relative to the body cylinder 11 due to the need for this alignment, the base plug 30 is needed to be able to effectively adjust the force exerted on the liner 20 during assembly. The base plug 30 can be readily adjusted to exert the optimal amount of force to hold the liner 20 in place inside of the body 10. In the preferred embodiment, the force is adjusted by screwing the base plug 30 into the base 12 with complementary threads 32. Other adjustment means are also possible.

Figure 2:
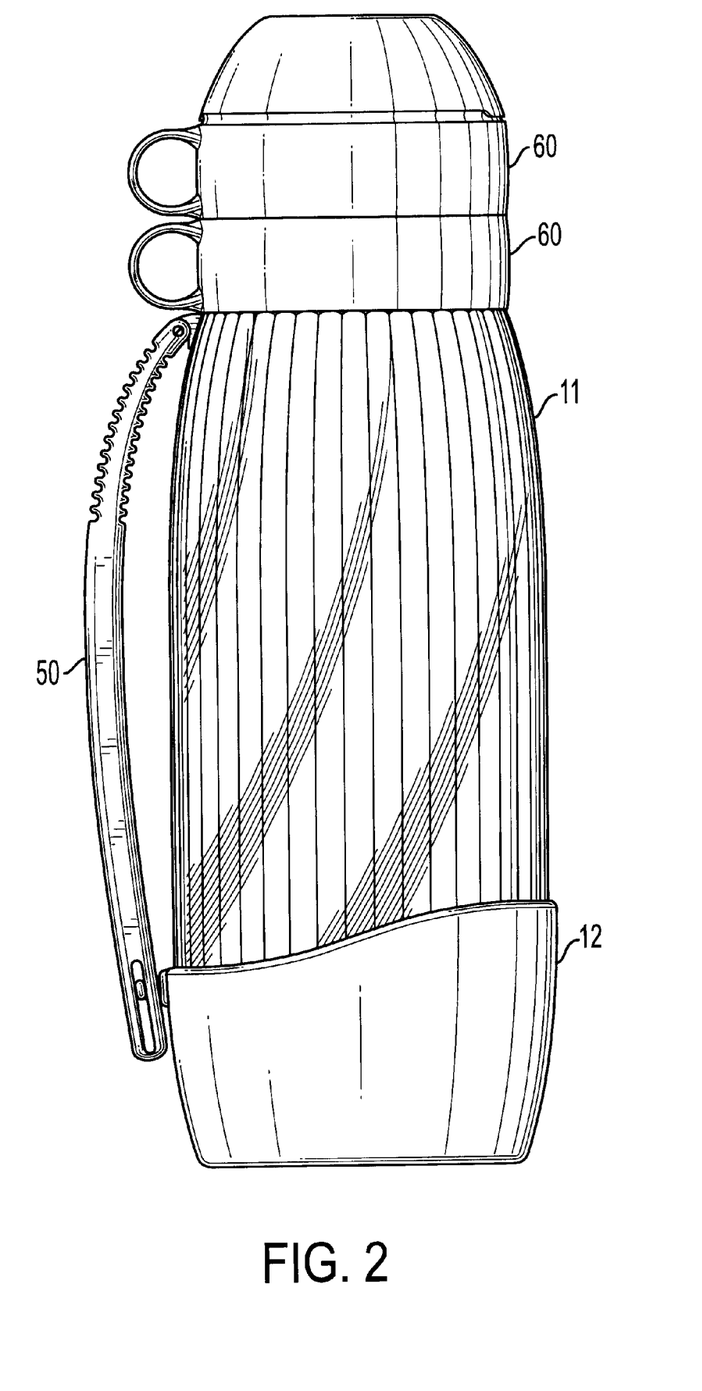
FIG. 2 is a side elevational view of the container of FIG. 1.

Two removable drinking cups 60 may be releasably stored on the container 100 as shown in FIG. 2, with a first cup 60 nesting on top of the container 100 proximate the first open end 10*a*, and a second cup 60 nesting on top of the first cup 60. In the preferred embodiment, the cups 60 are identical to simplify manufacturing. Yet they need not necessarily be entirely identical. For example, the cups 60 may have some differences, yet still include identical nesting features so that the nesting order of the cups 60 is not exclusive and the user need not determine which cup 60 is a bottom cup and which cup 60 is a top cup 60. Since the cups 60 are identical in the preferred embodiment, the features of the cups 60 can be described with reference to a single cup 60.

Figure 3:
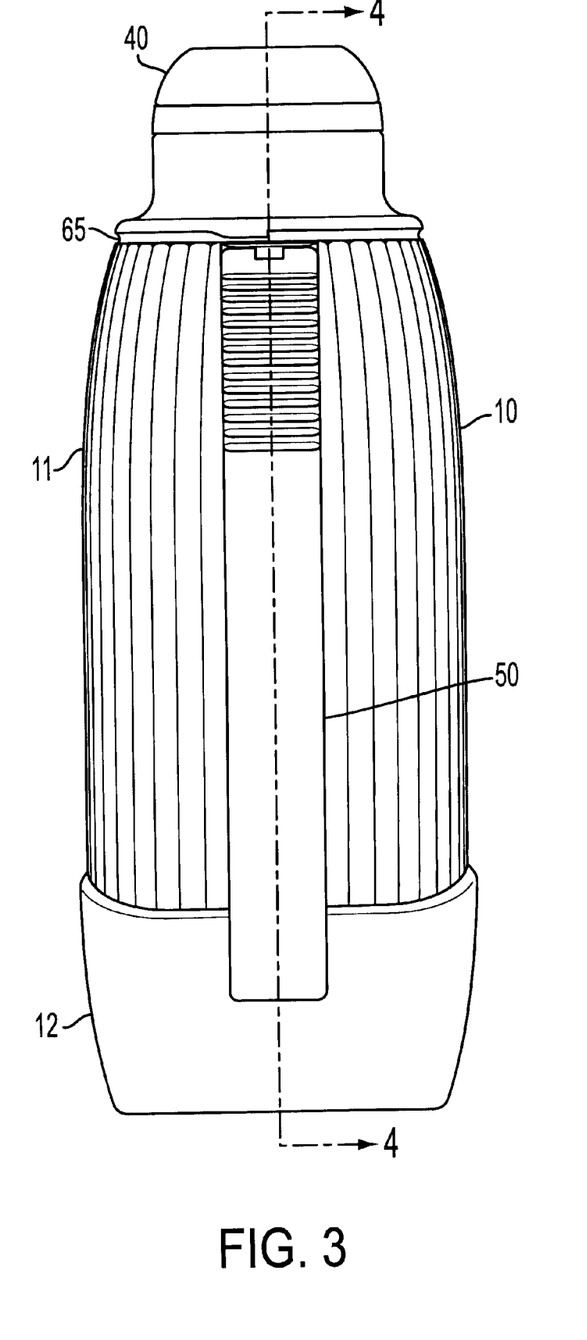
FIG. 3 is a rear elevational view of the container of FIG. 1 with the two cups removed.

In FIGS. 7–13, the cup 60 has an interior locking flange 61 and an exterior locking groove 65 integrally formed thereon. It is the interaction between the interior locking flange 61 and the exterior locking groove 65 which permits nesting—releasably attaching one of the cups 60 on top of another. The interior locking flange 61 and the exterior locking groove 65 are positioned so that they will be in close proximity to one another when one of the cups 60 is placed on top of another of the cups 60. In addition, the body 10 also includes the exterior locking groove 65 as shown in FIG. 3, so that one of the cups 60 may be nested on top of the container 100 for convenient carrying.

The interior locking flange 61 includes six separate regions: two separate stopping regions 62, two separate retaining regions 63, and two separate free regions 64. The different regions are easily recognized in cross-section in FIG. 8. Each of the stopping regions 62 includes a stopping surface 62*a* and a ramping surface 62*b*. Each of the retaining regions 63 includes a radially-inward extending surface whose radius R1 (FIG. 12) is smaller than the radius R2 (FIG. 10) of the surfaces of the interior locking flange 61 in each of the free regions 64. The radii herein are measured at right angles from the central axis A1 of the cup 60 to the surfaces. In the preferred embodiment, the stopping regions 62 as well as the retaining regions 63 are symmetrically arranged on diametrically opposed sides of the interior locking flange 61. The regions could also be asymmetrically arranged. The preferred embodiment also includes two of each region, however one or more than two of each region is also acceptable.

The exterior locking groove 65 includes two separate stopping regions 67. The two stopping regions 67 are easily recognized in cross-section in FIG. 9. Each of the stopping regions 67 includes a stopping surface 67*a* and a ramping surface 67*b*. Located above the exterior locking groove 65, in a direction following the narrowing of the cup 60, is a top lip 66. The largest radius R3 (FIG. 12) of the top lip 66 above the stopping region 67 is larger than the largest radius R4 (FIG. 10) of the top lip 66 above the other regions of the exterior locking groove 65. In the preferred embodiment, the stopping regions 67 are symmetrically arranged on diametrically opposed sections of the exterior locking groove 65. The regions could also be asymmetrically arranged. The preferred embodiment also includes the two stopping regions 67, however, one or more than two is also acceptable.

The relationship of the radii are as follows: R1<R2<R4<R3. Thus, it is necessary for the interior locking flange 61 to flex in order for it to slide over and engage the exterior locking groove 65 since the smallest radius R4 of the top lip 66 is smaller than the smallest radius R1 of the retaining region 63. This flexion is possible since the cups 60 are constructed of plastic and are relatively thin-walled. Normally, the user will apply a generally downward force against a top cup 60 to flex the interior locking flange 61 into engagement with a bottom cup 60. Once engaged, an opposite force will cause the cups 60 to disengage.

Figure 14:
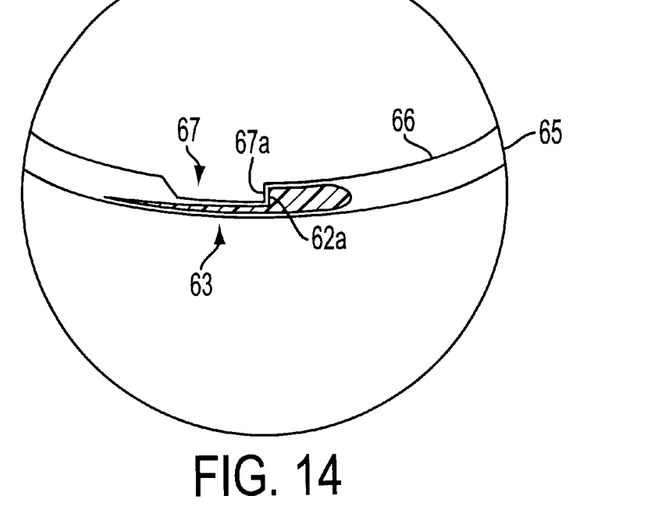
FIGS. 14 and 15 are perspective sectional views of the cups of FIG. 1 nested together, with most of the top cup cut away and the remainder thereof shown in section.
Figure 15:
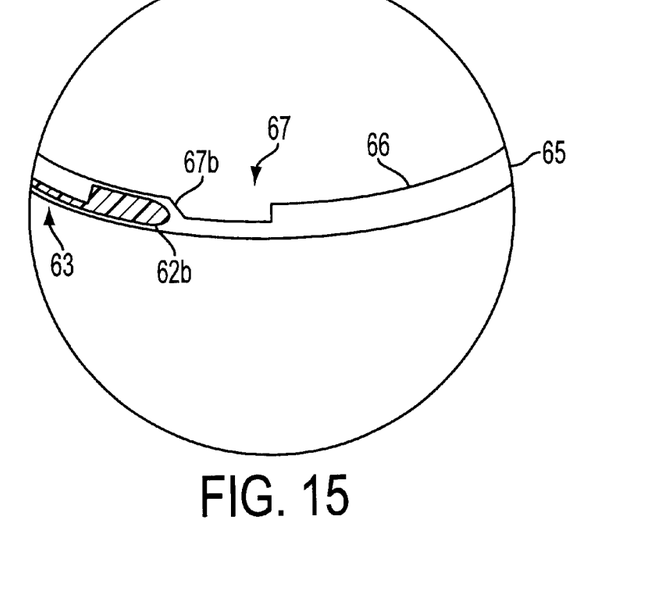

As shown in FIG. 14, once the interior locking flange 61 is engaged with the exterior locking groove 65, if the two cups 60 are rotated relative to one another in a first direction, the stopping surfaces 62*a* and 67*a* will abut and prevent any further relative rotation in the first direction. As shown in FIG. 15, if the cups 60 are rotated relative to one another in a second direction opposite the first direction, the ramping surfaces 62*b* and 67*b* will cam against one another causing the interior locking flange 61 to flex outward and disengage from the exterior locking groove 65. This is a second method for disengaging the cups 60 which may be more convenient for some users who have difficulty applying force directly to the top cup to disengage the cups.

In the exterior locking groove 65 provided on the body 10, the stopping surface 62*a* is placed so that when the stopping surface 62*a* abuts the stopping surface 67*a* on the cup 60, the cup 60 will be aligned with the handle 50.

When the stopping surfaces 62*a* and 67*a* abut, as in FIG. 14, the retaining region 63 is located directly below the stopping region 67. Because the radius R3 of the top lip 65 is larger in the stopping region 67 and the radius R1 of the retaining region 63 is smaller in this region, applying force to disengage the cups 60 is even more difficult than it would ordinarily be. Thus, the position shown in FIG. 14 can be used as a locking position such as for storage or transport of the container with the nested cups 60. In practice, a user will normally align the retaining regions 63 of the interior locking flange 61 of the top cup 60 away from the locking regions 67 of the exterior locking groove 65 of the bottom cup 60 for engaging one cup 60 on top of another. In this position the least amount of force is necessary to flex the top cup 60 onto the bottom cup 60. The cups 60 can be aligned to this configuration for flexing the top cup 60 off of the bottom cup 60 as well.

It will be apparent to those skilled in the art that various modifications and variations can be made to the apparatuses of the present invention without departing from the scope or spirit of the invention. Thus, it is intended that the present invention cover the modifications and variations of this invention provided they come within the scope of the appended claims and their equivalents.

I claim:

1. A method of constructing a vacuum-insulated beverage container comprising a body with a body cylinder and a base, a vacuum-insulated liner, a stopper, and a handle, the method comprising the steps of:

a. attaching the base to the body cylinder;

b. attaching the handle to one of the base or the body cylinder by aligning an opening on a first end of the handle with a projection projecting from the one of the base or the body cylinder, inserting the projection in the opening, turning the handle 90° relative to the one of the base or body cylinder to lock the projection in the handle; and c. attaching the handle to the other of the base or the body cylinder by inserting a fastener into a hole formed on an opposing second end of the handle, and inserting the fastener into a hole formed on the other of the base or body cylinder.

2. The method of claim 1 wherein the hole is formed on the body cylinder.

3. The method of claim 1 wherein the fastener in step "c" is the only removable fastener used to attach the handle to the base and the body cylinder.

4. The method of claim 1 further comprising before step "a" the step of inserting the liner into the body cylinder.

5. The method of claim 4 wherein when the base is attached to the body cylinder, the base engages the liner to assist in holding the liner in position relative to the body cylinder.

* * * * *